Sept. 26, 1967  J. A. DONELAN ET AL  3,343,636
ELECTROSTATIC CLUTCHES

Filed Dec. 7, 1965  2 Sheets-Sheet 1

INVENTORS
JAMES A. DONELAN
HOWARD H.W. LOSTY

BY Finschlen, Finschlen & Ottings

ATTORNEYS

Sept. 26, 1967     J. A. DONELAN ET AL     3,343,636
ELECTROSTATIC CLUTCHES

Filed Dec. 7, 1965                               2 Sheets-Sheet 2

INVENTORS
JAMES A. DONELAN
HOWARD H. W. LOSTY

BY
ATTORNEYS

United States Patent Office 3,343,636
Patented Sept. 26, 1967

3,343,636
ELECTROSTATIC CLUTCHES
James A. Donelan, West Harrow, and Howard H. W. Losty, Watford, England, assignors to The General Electric Company Limited, London, England, a British company
Filed Dec. 7, 1965, Ser. No. 512,064
Claims priority, application Great Britain, Dec. 8, 1964, 49,935/64
9 Claims. (Cl. 192—84)

ABSTRACT OF THE DISCLOSURE

An electrostatic clutch of the Johnsen-Rahbek type having two mutually engageable components which can experience relative movement when disengaged and no relative movement when engaged, the engageable surfaces of the components being in slipping contact when the components are disengaged and experiencing relative motion, one of the components having an engageable surface member formed by a plurality of separate sections, each individually mounted by a ball bearing on the body of that component so as to be capable of universal pivotal movement relative to said body.

---

This invention relates to electrostatic clutches of the kind (hereinafter referred to as "the kind specified") depending upon the Johnsen-Rahbek effect for their operation.

The Johnsen-Rahbek effect is the production of an electrostatic attraction, known as the Johnsen-Rahbek force, between a surface of an electrically conducting member and a closely adjacent surface of a semiconductive member, under the application of a voltage between the said members. When the said surfaces are initially in such close juxtaposition that they are in slipping contact, the Johnsen-Rahbek force produced between them when the voltage is applied is capable of causing adhesion between the surfaces, provided that the applied voltage is sufficiently high to produce a Johnsen-Rahbek force of the requisite magnitude. This effect, and its application in effecting engagement between two components of an electrostatic clutch, are described by A. D. Stuckes in an article entitled, "Some Theoretical and Practical Considerations of the Johnsen-Rahbek Effect," published in the Proceedings of the Institution of Electrical Engineers, volume 103 (B), 1956, pages 125 to 131.

The term "clutch" as employed herein is to be understood to mean a device comprising two mutually engageable components between which there may be relative movement when disengaged but substantially no relative movement when engaged. Thus a clutch may consist of a driving component and a driven component to which the motion of the driving component is imparted on engagement of the two components, or of a stationary component and a movable component the motion of which is stopped on engagement with the stationary component, the latter arrangement thus performing the function of a brake. In the case of an electrostatic clutch, the components are arranged to be in slipping contact when disengaged and in relative motion.

The invention is especially, although not exclusively, concerned with electrostatic clutches of the kind specified which are of the type comprising a rotatable driving component and a driven component, engageable therewith, which is caused to rotate at substantially the same speed when fully engaged with the driving component. For example, each of the clutch components may be a disc or cylinder, the mutually engageable surfaces of the components (the end face in the case of a cylinder) being in general substantially perpendicular to the axis of rotation which is common to both components, the said surfaces being so shaped as to conform closely to one another and being in slipping contact when not engaged. One component of the clutch comprises a semiconductive member consisting of a surface layer of semiconductive material, which provides the engageable surface of the component and which is in contact either with a metal body forming the main part of the said component or with an electrically conducting layer interposed between the semiconductive layer and the main body of the component if the latter is of insulating material. The second component of the clutch may be formed wholly of metal or may include a metal member forming the engageable surface. It is immaterial, from the point of view of the production of the Johnsen-Rahbek effect, whether the semiconductive layer is provided on the driving component or on the driven component.

The term "engageable surface" is used herein to refer to that surface of a clutch component which is arranged, in operation of the clutch, to engage with a surface of the other component of the clutch, and the term "engageable surface member" means an electrically conducting or semiconductive layer or member a surface of which provides such an engageable surface.

The electrically conducting parts of the clutch components, that is to say the metal engageable surface member of one component and the metal body or layer in contact with the semiconductive engageable surface member of the other component, are arranged to be connected to a source of electric current supply for the application of the required voltage between the said surface members of the components, for effecting operation of the clutch.

It is an object of the present invention to provide an improved construction of an electrostatic clutch of the kind specified.

According to the invention, in an electrostatic clutch of the kind specified and comprising two mutually engageable components between which there may be relative movement when disengaged and substantially no relative movement when engaged, and the engageable surfaces of which are in slipping contact when disengaged and in relative motion, the engageable surface member, as hereinbefore defined, of one of the clutch components is formed in a plurality of separate sections each individually mounted on a surface of the main body of said component so as to be capable of pivotal movement, relative to said main body, such that the engageable surface of each of said sections is individually alignable with the engageable surface of the second component of the clutch when the two components are in the disengaged position.

Preferably each of said individual engageable surface member sections is mounted so as to be capable of universal pivotal movement relative to the main body of the clutch component of which they form part.

The ability of the engageable surface sections of one component of the clutch to be aligned individually with the engageable surface of the other component will in general enable closer interfacial contact to be obtained between the two engageable surfaces as a whole, when they are in slipping contact, than if both said surfaces are included in single, integral, surface members. This improved interfacial contact ensures that, on the application of a voltage between the engageable surface members, the Johnsen-Rahbek force produced is rapidly effective to cause the said surfaces to engage, so that a clutch in accordance with the invention is advantageous in that it is capable of high speed operation. The improved interfacial contact between the clutch components also results in a reduction in the amount of slip occurring between the surfaces when they are engaged. The term "slip" is applied to the relative difference in speed of movement between the two components of the clutch: when the components are engaged the slip is only slight, being observable by stroboscopic methods, and is expressed as "slip angle" per revolution in the case of a clutch comprising rotating driving and driven components. The above statement that there is "substantially" no relative movement between the clutch components when engaged is intended to refer to the possible slight amount of slip between them.

The invention will be further described mainly with reference to rotating clutches, that is to say clutches of the type comprising a driving component and a driven component which are rotatable about a common axis.

A number of other advantages can be obtained with a clutch construction in accordance with the invention: thus we have found that an increase in the torque transmitted in operation of a rotating clutch can be obtained, for a given clutch size and power input, as compared with that obtained with the conventional disc clutch construction comprising two single discs engageable with one another. We have also found that suitable drive conditions for a clutch according to the invention are easily obtained, and that, provided that the frictional drag between the clutch components is relatively low, for example about 2 lbs. inch, prolonged periods of slipping between operations of the clutch do not result in appreciable wear of the surfaces or have any deleterious effect on the performance of the clutch. Furthermore, great accuracy of alignment between the engageable surfaces as a whole, and of the finish of the surfaces, in manufacture of the components of a clutch in accordance with the invention, are not necessary, with resulting easement of manufacturing tolerances.

The individually mounted surface sections may constitute the engageable member of either the driving component or the driven component of a rotating clutch, and may be formed either of a suitable metal for forming the electrically conducting surface, or of a suitable semiconductive material for forming the semiconductive surface of the clutch.

In some cases, for example for ordinary direct current operation, each engageable surface member may be in conductive connection with the main body of the clutch component on which it is mounted and, for operation of the clutch, electrical connections may be arranged to be made directly to the main bodies of both components, one or both of which must then be suitably insulated.

Alternatively, if the individually mounted sections constitute the metal surface member, they may be, and for some modes of operation are (as will appear later), mounted on an insulating body which may form, or may be supported by, the main body of the clutch component concerned, and suitable conductors are then provided on or within the said component for connecting the said sections to an electric current supply for operation of the clutch. If the said individual sections constitute the semiconductive surface member, each section is supported on, or attached to, a metal member or layer, such metal members or layers being in close contact with the respective sections of semiconductive material. These metal members or layers similarly may be, and for some modes of operation are, insulated from one another, and are then arranged to be connected to an electric current supply by means of suitable conductors provided on or within the body of the clutch component.

An electrostatic clutch according to the invention can be operated either from a direct current supply, or from a single phase or polyphase alternating current supply. For direct current or single phase alternating current operation, the individually mounted surface sections constituting the engageable surface member of one of the clutch components will be arranged to have a common input means for connection to the supply. The clutch of the invention is, however, particularly suitable for operation from a polyphase supply, since the individual surface sections can conveniently be arranged to be separately connected to the respective supply conductors from the different phase circuits. Thus in a preferred method of operating a clutch in accordance with the invention, the individually mounted surface sections of one component are arranged to be connected separately to the respective phase line conductors of a star-connected polyphase alternating current system, at least one said section being provided for connection to each phase circuit, and the single engageable surface member of the other clutch component is arranged to be connected to the neutral conductor of the polyphase system, if desired. Connection of the second component to the neutral conductor of a balanced polyphase system is, however, not essential. Furthermore in a clutch which is to be operated from a balanced polyphase system, it will be necessary to ensure that the said individually mounted surface sections all possess the same electrical impedance. This is conveniently achieved by forming all said sections of the same dimensions.

For polyphase operation of a rotating clutch, preferably a pair of the said individually mounted surface sections is provided for connection to each phase circuit, the sections of each pair preferably being located diametrically opposite to one another on the face of the appropriate clutch component. Thus, for example, four such sections may be provided for two-phase operation and six sections for three-phase operation. If desired, more than two said sections may be provided for connection to each phase circuit, the sections to be connected to any one phase preferably being symmetrically spaced apart upon the face of the clutch component.

The required mobility of the engageable surface member sections can be achieved by mounting the individual sections on ball bearings, which are suitably supported in apertures or recesses in the body of the clutch component. Preferably each such ball bearing is supported on one end of a compression spring, which is retained in a chamber within the component body. Electrical connections can then be conveniently made from each surface section, through the appropriate ball bearing and spring, to a conductor carried on the component, for example a slip-ring, for connection to the supply when the body of the clutch component is of insulating material.

Usually, in a clutch of the type comprising two substantially cylindrical components, the mutually engageable surfaces of the components are the substantially plane end surfaces; in a clutch of this type in accordance with the present invention, the individually mounted surface sections of one component, and the engageable surface member of the other component, will usually have substantially plane engageable surfaces. However, the mutually engageable surfaces need not necessarily be plane, but may be of any desired conformation, provided that each said individual surface section is of such a shape that its engageable surface conforms closely to that portion of the surface of the other clutch component with which it is arranged to engage in operation of the clutch.

The engageable surfaces of the individually alignable surface sections may be circular, the sections of the relevant engageable surface member being in the form of discs. In some cases, however, for obtaining higher values of the torque transmitted in operation of a rotating clutch, the engageable surface area of each section is made as large as possible, the sections being so shaped and arranged on the face of the main body of the clutch component on which they are mounted that they occupy nearly the whole of the said face of the main body, with only small insulating spaces between the sections. Thus in one preferred arrangement, where the said clutch component is a cylinder or disc and the engageable surface member sections are mounted on a circular end face of the main body of the component, the said sections are each in the form of a sector of a circle and are arranged so that the arcs of the sectors lie close to, and substantially parallel to, the perimeter of the face of the main body, the narrow ends of the sectors enclosed by the two radii, which ends may be angled, truncated, or curved, extending towards the centre of the said face of the main body.

The semiconductive material employed for the construction of either the individually mounted surface sections, or the single engageable surface member of the other clutch component, as the case may be, can be any semiconductive material known to be suitable for use in electrostatic clutches employing the Johnsen-Rahbek effect, such as some ceramic dielectric materials. However, the preferred material for use for the semiconductive surface member or sections, in a clutch in accordance with the invention, is semiconductive carbon preferably composed of partially carbonised regenerated cellulosic or hemicellulosic material, which is advantageous for use in electrostatic clutches since it possesses self-lubricating properties, and also possesses electrical resistivity in a range of suitable values, is hard and machinable and can be polished to give a satisfactory surface finish, and has suitable friction characteristics and thermal conductivity, the electrical, frictional and thermal properties being adjustable as desired by control of the process of manufacture of the carbon. In addition, when this semiconductive carbon is employed for the individually mounted surface sections, as is preferred, in a clutch in accordance with the invention, the asperities present on the carbon surface are considerably worn down during the initial periods of slipping between the clutch components, due to a polishing action of the metal surface in slipping contact with the carbon surface. This adjustment of the carbon surface results in a marked increase in the torque available, and reduction of the slip angle, in operation of a rotating clutch, as compared with the torque and slip angle characterising the clutch when it is first assembled. Furthermore this polishing action results in an increase of the true area of contact, a decrease in the effective width of the air gap, and an increase in the electric field, between the engageable surfaces of the clutch components during slipping; on engagement of the surfaces, the high electric field causes etching of the carbon surfaces, which in turn results in a decrease in the electric field: thus in a clutch in accordance with the invention, with individually alignable surface sections composed of semiconductive carbon of the kind referred to, the micro-roughness of the carbon surface is self-adjustable, in operation, to maintain the electric field between the engageable surfaces substantially constant.

A specific form of clutch in accordance with the invention, and an arrangement comprising a combination of two clutches according to the invention, will now be described by way of example, with reference to the accompanying drawings, in which.

In the drawings, like parts are indicated by the same reference numerals in the respective figures.

Figure 1:
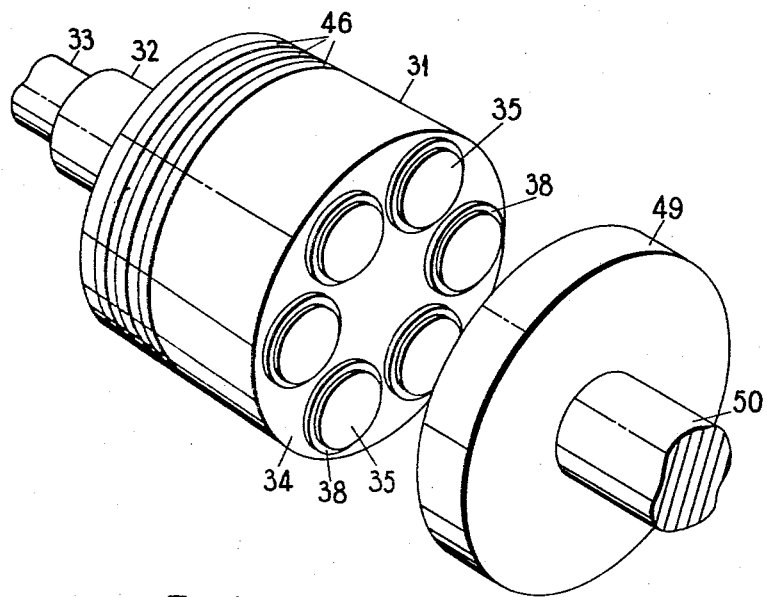
FIGURE 1 is a perspective view of the two components of a clutch of the form comprising a driving component and a driven component both rotatable about a common axis.
Figure 2:
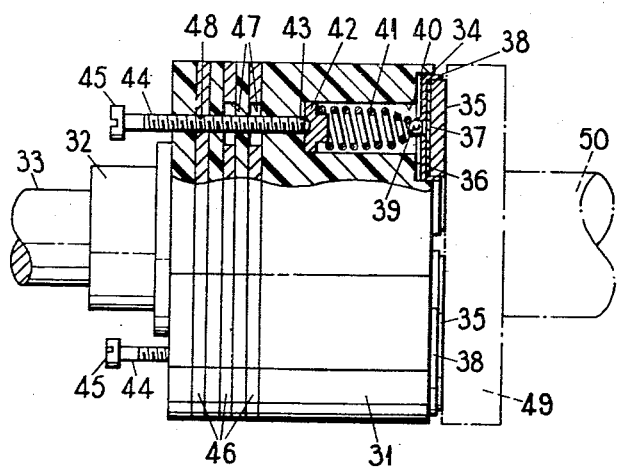
FIGURE 2 is a part-sectional side elevation of the driving component of the clutch shown in FIGURE 1.

Referring to FIGURES 1 and 2 of the drawings, the driving component of the clutch comprises a cylindrical main body, 31, of high strength insulating material, for example a high strength synthetic resin, carried on a mild steel hub 32, the extension of which, 33, is arranged to mate onto the output shaft of the power source employed to drive the clutch (the said power source is not shown in the drawing). On the end face 34 of the insulating body 31 are mounted six discs of semiconductive carbon, 35, all of the same dimensions and equally spaced around the periphery of the face 34, being located in recesses 36. Each carbon disc is backed with a coating of silver, 37, and is mounted in an aluminum cup 38, the silver-coated surface of the carbon disc being fixed to the interior surface of the aluminum cup by means of an adhesive resin containing a dispersion of silver flake. A steel ball 39 is fixed to the centre of the outer surface of each of the aluminum cups: this ball serves to locate the aluminum cup and carbon disc centrally with respect to the open end of a chamber, 40, in the insulating body 31, communicating with said recess 36. The steel ball also serves as a bearing on which the cup and disc can pivot so as to be capable of universal movement with respect to the end face 34. Each chamber 40 houses a helical compression spring 41, upon one end of which the steel ball 39 bears when the aluminum cup is in position in the recess 36. A small brass cup, 42, is spigoted into the end of each spring 41 which is remote from the carbon disc assembly, and the recess 43 in said cup serves to locate a screw, 44, which is fixed by means of a screwhead 45.

One or more brass discs, 46 (three are shown in the drawing), are located in that end of the driving component which contains the screws 44, said discs extending to the exterior of the insulating body 31, so that their peripheries form slip-rings on the exterior of the component; the brass discs are insulated from one another by portions of the insulating body 31. Each of the discs 46 is provided with six equally spaced holes, located in such positions that each of the six screws 44 will pass through a hole in each disc: the holes in each disc consist of four clearance holes, 47, through which four of the screws 44 pass without coming into contact with the disc, and two smaller, screw-threaded holes, 48, with which two of the screws 44 co-operate, the two screw-threaded holes in each disc being located diametrically opposite to one another with respect to the circumference of the disc. Electrically conducting connection of the conducting backing layer, 37, of each carbon disc, 35, to a slip-ring (that is to say to the periphery of one of the brass discs 46) is thus provided through the conducting adhesive and the aluminum cup 38, the steel ball 39, spring 41, brass cup 42, and screw 44 co-operating with the appropriate brass disc 46. For three-phase operation of the clutch, two diametrically opposed carbon discs are connected in this way to each slip-ring, and each slip-ring is arranged to be connected to one phase line conductor by means of a brush, in known manner.

One preferred method of preparing the carbon discs 35, employed in the driving component described above, comprises beating hemicellulosic pulp in water, the concentration of the pulp being 2% by weight, for four hours in a standard type of beater of the kind used in the paper-making industry, regenerating the hemicellulosic material by centrifuging the aqueous dispersion to remove the free water therefrom, pressing the centrifuged pulp in the form of discs, drying the discs and finally heating them to 500° C. in nitrogen under a pressure of about 300 atmospheres. The surfaces of the discs which are arranged to engage with the surface of the driven component in operation of the clutch are subjected to a suitable polishing treatment for imparting the required degree of smoothness to the surfaces.

The driven component of the clutch, shown in FIGURE 1 of the drawings, comprises a plate, 49, of steel composed of 0.27–0.35% carbon, 0.5% manganese, 0.1–0.35% silicon, 0.05% lead, 2.3–2.5% nickel, 0.4–0.7% molybdenum, 0.5–0.8% chromium, and the balance iron, this plate being mounted on a shaft 50. In a modification, not shown in the drawing, the steel plate may be thinner and may be mounted on a light alloy hub which is in turn mounted on a shaft.

The construction of the driving component of the clutch of the form shown in FIGURES 1 and 2 of the drawings has been described with particular reference to the method of operating the clutch from a three-phase star-connected alternating current supply: thus for this mode of operation, one diametrically opposed pair of carbon discs is connected to each of three slip-rings 46, and each slip-ring is connected to one of the phase line conductors. However, a clutch of this form can, alternatively, be operated from a direct current supply or from a single phase alternating current supply: in either of these cases the six carbon discs, 35, are all arranged to be connected to a single supply conductor by means of a common conductor, for example by arranging that all of the six screws 44 co-operate with a single brass disc 46.

In all of the above modes of operation, the steel plate 49 of the driven component of the clutch may be arranged to be connected to a single supply conductor, this being the neutral conductor in the case of single phase of polyphase alternating current operation. Alternatively, when the supply is a balanced polyphase system, for example a star-connected system, the plate 49 may be earthed. In the case of direct current operation, the steel plate 49 is connected to the positive pole, and the carbon discs are connected to the negative pole, of the supply. The steel plate 49 may itself be directly connected to the supply, or if desired the driven component may be provided with a slip-ring for connection to the supply.

In the operation of a clutch of the form shown in FIGURES 1 and 2, the Johnsen-Rahbek force required for causing the carbon discs to engage with the steel plate 49 is developed in one micro-second after the application of a suitable voltage, and the driven component is then accelerated to the operating speed in 50 to 60 microseconds.

The results of tests which we have carried out on a clutch of the form described above with reference to FIGURES 1 and 2 of the drawings, when operated from direct current, single phase alternating current, and star-connected three-phase alternating current supplies, respectively, are shown in the following table. In the particular clutch used for the tests, the six carbon discs were each 24 mm. in diameter and 0.5 mm. in thickness, and the exposed carbon surfaces of the individual discs were lapped with 600 grade Carborundum prior to assembly of the driving component of the clutch, final polishing of the said surfaces of the discs being achieved by allowing the clutch to operate under controlled slip conditions.

torque" is the load at which the clutch will repeatedly engage when there is 100% slip between the components; the "frictional drag" is the torque produced by frictional effects between the mutually engageable surfaces of the clutch when the clutch is electrically de-energized; the "drive to drag ratio" is the ratio of the running torque transmitted to the frictional drag, the average figure for the frictional drag being used in this case; and the "control ratio" is the ratio of the power (in watts) transmitted through the clutch to the power unit.

Figure 3:
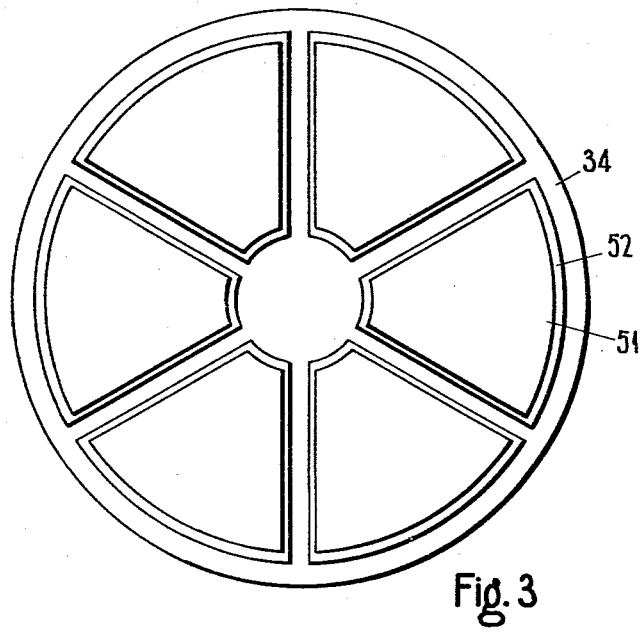
FIGURE 3 is a front elevation of a modified form of the engageable surface of the driving component of a clutch similar to that shown in FIGURES 1 and 2.

FIGURE 3 shows, in elevation, the end face 34 of the driving component of a clutch of the same form as that described above with reference to FIGURES 1 and 2, modified in that the engageable surface of this component is formed in six separately mounted sections, 51, each in the shape of a sector of a circle, and all of the same dimensions and equally spaced around the face 34. The surface sections 51 are formed of semiconductive carbon manufactured by a process similar to that described above with reference to the discs 35 shown in FIGURES 1 and 2; in this case the regenerated hemicellulosic pulp is pressed in the form of a sheet, the sheet is dried, and portions of the required shape of the sections 51, but somewhat larger to allow for shrinkage during the subsequent heating, are cut from the dried sheet and are then heated to effect the required degree of carbonisation.

The manner of mounting the carbon sections 51 on the driving component is not shown in FIGURE 3, but is similar to the manner of mounting the discs 35 shown in FIGURE 2. Thus the carbon sections 51 are mounted in recesses in the end face 34, each section 51 being backed with silver and fixed in an aluminium cup 52 of shape corresponding to that of the carbon section, and the exterior surface of each aluminium cup is fixed to a steel ball for locating the cup and carbon section in a chamber in the clutch component and for imparting universal pivotal movement to the section.

In all other respects the construction and manner of operation of the clutch provided with carbon surface sections of the form shown in FIGURE 3 are similar to those described above with reference to FIGURES 1 and 2.

The rapid engagement of the engageable surfaces of the components, and the reduction in the amount of slip occurring between said surfaces when engaged, achieved by the construction of a clutch component with a plurality of individually mounted surface sections, in accordance with the invention, render this construction particularly advantageous for use, not only in a clutch for operation as described above, but also in an electrostatic braking mechanism. Thus a clutch construction of the kind described herein can readily be adapted for brake operation by arranging that one of the components is fixed in the stationary condition, the other component being capable of rotation or other motion, such as reciprocating motion, relative to the stationary component, so that on engage-

TABLE

| Supply voltage | Torque, lbs.-inch, at 700 r.p.m. | | | Drive to drag ratio, avg. | Slip angle, degrees per revolution | Current used and power input | Power transmitted, brake horse power | Control ratio |
| --- | --- | --- | --- | --- | --- | --- | --- | --- |
| | Running torque | On load starting torque | Frictional drag | | | | | |
| 240 D.C. | 32.0 | 16.0 | 1.5 to 2.5 | 16:1 | 0.3 | 18 milliamps, 4.5 watts | 0.34 | 58:1 |
| 390 D.C. | 38.0 | 15.5 | ---do--- | 19:1 | (¹) | 35 milliamps, 13 watts | 0.4 | 22:1 |
| 415 three-phase A.C. | 26.0 | 13.8 | ---do--- | 13:1 | 0.12 | 8 milliamps, 5.5 watts | 0.27 | 42:1 |
| 240 single phase A.C. | 22.0 | 11.6 | ---do--- | 11:1 | 0.8 | 21 milliamps, 5 watts | 0.23 | 36:1 |

¹ Not detectable.

The slip angle (as hereinbefore defined) referred to in the table was measured at a torque of 20 lbs. inch in each case. Of the remaining terms employed in the column headings of the table, the "running torque" is the torque transmitted when the clutch components are engaged, and is measured by dynamometer at the threshold of slip after the gradual application of the load; the "on load starting ment of the mutually engageable surfaces of the two components, as a result of the application of a voltage between the components, the motion of the movable component is stopped. In such an arrangement the individually mounted surface member sections may constitute the engageable surface member of either the movable component or the stationary component, and it is immaterial which component has the electrically conducting surface member, and which the semiconductive surface member.

The present invention includes within its scope clutch arrangements consisting of, in combination, two or more electrostatic clutches of the kind specified, wherein one engageable surface member of each clutch of the combination is formed in a plurality of sections in accordance with the invention. In such an arrangement, one component may form part of two clutches, each face of said component being engageable with another component of the arrangement.

In one particular application of the invention, a clutch mechanism and a brake mechanism can be combined in a single arrangement. Such an arrangement comprises three components, namely a driving component, a stationary component, and, located between these two components, an intermediate component which is arranged to engage alternatively with the driving component and the stationary component, for imparting motion to the intermediate component and for braking such motion, respectively.

Figure 4:
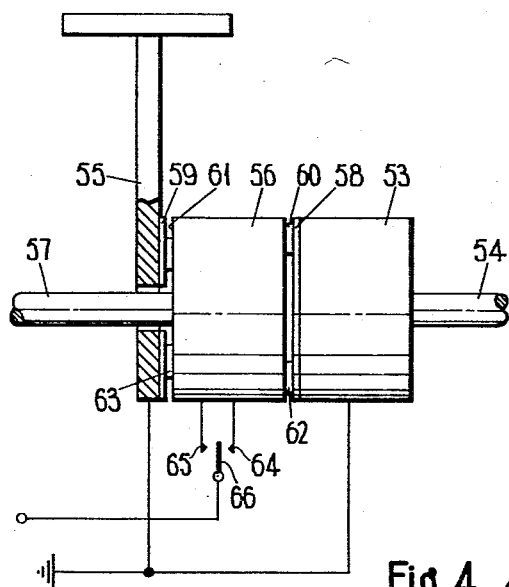
FIGURE 4 is a diagrammatic part-sectional elevation of an arrangement comprising a combination of a clutch mechanism and a brake mechanism, both constructed in accordance with the invention.

A clutch-and-brake arrangement of the last-described kind is shown diagrammatically in FIGURE 4 of the accompanying drawings. This arrangement consists essentially of a rotatable driving component 53 carried on a shaft 54 connected to a power source (not shown) by which the clutch is driven, a stationary braking component 55, and an intermediate component 56 which is capable of engaging with either the driving component 53 or the braking component 55, as desired, the intermediate component 56 being mounted on a shaft 57 for connection to a mechanism to be operated by means of the clutch-and-brake arrangement: the shaft 57 passes through an aperture in the stationary component 55.

The engageable surface members, 58 and 59, of the driving component and the braking component respectively, are both formed of metal, and both faces, 60 and 61, of the main body of the intermediate component 56 are provided with sectional surface members in accordance with the invention, the sections being formed of semiconductive carbon and being mounted on the main body of the component in a manner similar to that described above with reference to FIGURES 1 and 2. These sections may be of any desired shape, but are shown in the drawing in the form of discs, 62 and 63, mounted on the main body faces 60 and 61 respectively, the respective sets of discs on the two surfaces being mounted out of alignment with one another, as shown (only two discs of each set are shown, for clarity), to facilitate accommodation of the mounting arrangements and electrical conductors, associated with the discs, within the main body of the component 56.

For operation of the clutch-and-brake system shown in FIGURE 4, electrical conductors provided on and within the component 56, and connected respectively to the sets of carbon discs 62 and 63, are also connected respectively to two terminals, 64 and 65, which can be alternatively connected to a source of electric current supply by means of a switch 66. Suitable connections are also made to the driving component 53 and the braking component 55, so that when the terminal 64 is connected to the supply by means of the switch 66 a voltage is applied between the engageable surfaces 58 and 62, and the component 56 is engaged with the driving component 53 and the motion of the latter is imparted to the intermediate component 56; and when the terminal 65 is connected to the supply by changing over the switch 66 a voltage is applied between the engageable surfaces 59 and 63, and the intermediate component 56 is engaged with the stationary component 55 to effect braking action on the component 56. As shown in the drawing, the system is arranged to be operated from a direct current supply, the components 53 and 55 being earthed. However, the system may alternatively be operated from a single phase or polyphase alternating current supply: in the case of a three-phase supply, for example, each of the engageable surface members 62 and 63 consists of six discs, the arrangements for mounting and connecting each set of discs being similar to those shown in FIGURE 2.

We claim:
1. An electrostatic clutch of the kind
   (A) operated by means of an electrostatic attraction produced between a surface of an electrically conducting member and a closely adjacent surface of a semiconductive member when a voltage is applied between the said members
      (I) which voltage is sufficiently high to produce a said electrostatic attraction of such magnitude as to cause adhesion between the said surfaces, and
   (B) said clutch comprising two components each of which comprises a main body having a surface member directly engageable with a surface member of the other component, the said surface members being composed respectively of an electrically conducting material and a semiconductive material,
      (I) which components are capable of relative motion when the said mutually engageable surface members are disengaged, in the absence of a said applied voltage, the said surface members being in slipping contact with one another when disengaged, and
      (II) between which components there is substantially no relative motion when the said mutually engageable surface members are engaged as a result of the application of a said voltage;
   (C) wherein the said engageable surface member of a first said clutch component consists of a plurality of separate sections
      (I) each individually mounted on a ball bearing located in a recess in the main body of the said component so as to be capable of universal pivotal movement relative to said main body,
         (a) whereby, when the said mutually engageable surface members are in the disengaged position and in slipping contact, each said individually mounted section is automatically aligned with, so as to be wholly in close interfacial contact with, the engageable surface member of the second of said clutch components,
            (i) for enabling engagement between each section of the engageable surface member of said first clutch component and the engageable surface member of said second clutch component to take place rapidly on the application of a said voltage between the said members.

2. A clutch according to claim 1, wherein each said ball bearing on which a said section is mounted is supported on one end of a compression spring which is retained in a chamber within the main body of the said component, which chamber opens out into said recess.

3. A clutch according to claim 1, wherein the said individually mounted sections are insulated from one another and wherein, for operation of the clutch from a polyphase alternating current supply, the main body of the clutch component of which the said sections form the engageable surface member carries conductors for connecting said sections separately to the respective supply conductors from the different phase circuits, at least one said section being provided for connection to each phase circuit.

4. A clutch according to claim 3, wherein at least two said sections are provided for connection to each phase circuit, and the sections to be connected to any one phase are symmetrically spaced apart upon the said surface of the main body of the clutch component of which the sections form the engageable surface member.

5. A clutch according to claim 1, wherein the individually mounted engageable surface member sections are of plane circular form.

6. A clutch according to claim 1, wherein the individually mounted engageable surface member sections are in the form of sectors of a circle.

7. A clutch according to claim 1, wherein the material employed for the construction of the semiconductive engageable surface member is semiconductive carbon composed of a partially carbonised regenerated material which is a member of the group consisting of cellulosic and hemicellulosic materials.

8. A clutch according to claim 7, wherein the individually mounted engageable surface member sections are formed of the said semiconductive carbon.

9. A clutch according to claim 1, which comprises a stationary component and a component capable of motion relative to the said stationary component and capable of engagement therewith for braking of said motion.

References Cited

UNITED STATES PATENTS

| | | | |
|---|---|---|---|
| 2,850,907 | 9/1958 | Foster | 192—84 |
| 2,924,314 | 2/1960 | Shepard | 192—18 |
| 3,240,306 | 3/1966 | Armstrong | 192—84 |

MARK M. NEWMAN, *Primary Examiner.*

ARTHUR T. McKEON, *Examiner.*